April 21, 1942.  R. V. KLEINSCHMIDT  2,280,093

DISTILLATION METHOD AND APPARATUS

Filed May 1, 1941  3 Sheets-Sheet 1

INVENTOR
Robert V. Kleinschmidt
BY Kenyon & Kenyon
ATTORNEYS

April 21, 1942.  R. V. KLEINSCHMIDT  2,280,093
DISTILLATION METHOD AND APPARATUS
Filed May 1, 1941  3 Sheets-Sheet 2

INVENTOR
Robert V. Kleinschmidt
BY Kenyon & Kenyon
ATTORNEYS

April 21, 1942. R. V. KLEINSCHMIDT 2,280,093
DISTILLATION METHOD AND APPARATUS
Filed May 1, 1941 3 Sheets-Sheet 3

CONDENSATE OVERFLOW HOT OVERFLOW

INVENTOR
Robert V. Kleinschmidt
BY Kenyon & Kenyon
ATTORNEYS

Patented Apr. 21, 1942

2,280,093

UNITED STATES PATENT OFFICE 2,280,093

DISTILLATION METHOD AND APPARATUS

Robert V. Kleinschmidt, Stoneham, Mass., assignor to Arthur D. Little, Incorporated, Cambridge, Mass., a corporation of Massachusetts Application May 1, 1941, Serial No. 391,282

31 Claims. (Cl. 202—75)

This invention relates to improvements in apparatus for and method of separating components of a fluid mixture of two or more substances by reason of their difference in boiling point or volatility. More particularly, my apparatus and process are applicable to those cases where both the initial mixture and the separated components are liquids during some portion of the process, but these liquids may be more or less concentrated solutions of solids, liquids or gases in liquids or liquid mixtures of materials normally in solid or gaseous form in the pure state. My apparatus and process relate generally to what is commonly referred to as distillation, fractionation, rectification, evaporation, concentration, and the like, which are characterized by the evaporation of a portion of a liquid mixture. Any such liquid mixture is referred to herein as a solution, and any such operation is referred to herein as distillation, for purposes of brevity.

It is a purpose of this invention to afford improved means and method of distillation of the type wherein a solution to be distilled is vaporized in a vaporization zone, vapors withdrawn from the vaporization zone are compressed to a pressure at which the condensing temperature is above the boiling point of the solution, the compressed vapors are condensed in out-of-contact heat exchange with the solution to be distilled, thereby furnishing heat for distilling solution in said vaporization zone, and hot condensate is utilized to preheat solution entering the vaporization zone.

Features of this invention relate to novel method and means for utilizing an internal combustion engine in connection with distillation of the type above mentioned so as to improve the operation and the efficiency of the system. According to the present invention, a source of energy in the form of fuel for the internal combustion engine supplies energy in the form of mechanical power generated by the engine and this energy is supplemented by sensible heat that is derived from the fuel and that would in the usual case be lost without useful effect. Some of the features of this invention relate to the manner of absorbing such sensible heat from the engine into the system without interfering with a proper balancing of the heat cycle. Other features of this invention relate to the means whereby the internal combustion engine may be maintained at proper operating temperature by cooling means forming part of the distillation apparatus. Still other features of this invention relate to the control of the sensible heat withdrawn from the system in relation to the sensible heat that is transferred into the system from the internal combustion engine and to the balancing of this relationship.

In my Patent Number 2,185,595, I have described a system wherein the only energy supplied to the system is mechanical energy introduced into the system by the compressor, the system being arranged to afford a heat balance such that the system can operate for the maintenance of distillation without supplying any energy other than the mechanical energy supplied by the compressor. Any compressor has some degree of inefficiency which results in the introduction of sufficient surplus heat to compensate for heat losses to the outside air. Such a system can be operated by driving the compressor using an electric motor or other motor such as an internal combustion engine. When an internal combustion engine is utilized to actuate the compressor, the modifications and improvements of the present invention may be availed of in an especially advantageous manner so as to bring about a co-operative relationship between the energy supplied to the compressor, waste heat incident to the operation of the internal combustion engine, and the heat losses occurring during the distillation. Such improvements relate both to the apparatus and the method employed in carrying out the distillation.

It is well known that a portion of the heat developed by combustion in the cylinders of an internal combustion engine must be removed from the cylinder walls to prevent them from overheating, and this is commonly done by circulating water or other cooling liquid through passages surrounding the cylinders. This liquid which will be referred to as "engine-cooling liquid" is thus heated, and is then commonly circulated through a radiator wherein the heat is transferred to a blast of air from a fan. The heat is discharged to the air and wasted. Such heat will be referred to herein, for the sake of brevity, as "waste heat." The operation of the fan may take from three to six per cent. of the power developed by the engine and represents a substantial loss of power. It is a feature of this invention that waste heat from an internal combustion engine can be put to useful service with resultant simplification in the method and apparatus used in carrying out the distillation operation, and that loss of power ordinarily incident to the operation of a fan can be saved.

There are optional ways of absorbing the sensible heat from the internal combustion engine in a distillation system of the type under consideration, as will be apparent from the more detailed description of illustrative embodiments of this invention which are given hereinbelow. Some of the features of this invention relate to the method and means whereby this excess heat may be successfully introduced into the distillation system without disrupting the heat cycle.

The present invention not only affords economies of operation but also permits of simplification and reduction in size of the heat exchangers used in the system. Utilizing the present invention, a self-contained complete distillation unit can be made which is suitable as a portable unit and which requires no facilities for operation other than a supply of a suitable fuel and a connection to a supply of liquid to be distilled. Employment of the present invention is also of advantage in minimizing fouling of overflow lines due to deposit of solids therein, a factor that is of considerable importance, especially where relatively highly concentrated salt solutions are discharged from the vaporization zone. The present invention also permits of construction wherein a less thorough application of heat insulation lagging to the exterior of the unit is permissible.

Further purposes, features and advantages of this invention will be apparent from the following description of this invention in connection with the illustrative embodiments thereof shown in the accompanying drawings, wherein Figure 1 is a side elevational schematic view of one embodiment of this invention;

Figure 1:
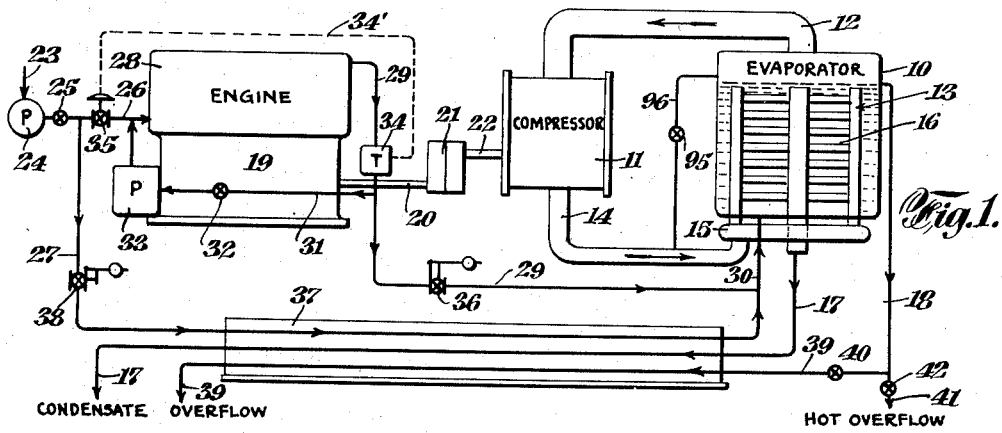

Referring to the embodiment of this invention shown in Fig. 1, the distillation unit includes a vaporization chamber 10 and a compressor 11. Vapor evolved in the vaporization chamber 10 is taken to the suction side of the compressor by the suction vapor line 12. Within the vaporization chamber 10 is a condenser heat exchange means 13 adapted to maintain a condensing vapor in out-of-contact heat exchange with solution in the vaporization chamber 10. Vapor compressed by the compressor 11 is directed to the condenser heat exchange means 13 by pressure vapor line 14. The compressed vapor in line 14 enters the header 15 and passes thence into the condenser heat exchange means wherein it condenses in the passages thereof, inasmuch as the compressor serves to raise the condensing temperature of the compressed vapor to a temperature above the boiling point of the solution in the evaporator. The passages of the condenser heat exchange means in which the vapor condenses are indicated by the reference character 16 and are shown schematically. It is apparent that any suitable type of condenser heat exchange means adapted to receive vapor and permit the condensation thereof in out-of-contact heat exchange with solution in the vaporization chamber may be used. The condensate resulting from condensation of the compressed vapors in the condenser heat exchange means flows out of the condenser heat exchange means through the line 17. Concentrated solution is withdrawn from the vaporization chamber through the line 18 and the level of the mouth of the line 18 may serve to control the normal liquid level of solution in the vaporization chamber.

The compressor is operated by an internal combustion engine 19. This engine is of any conventional type having the combustion chamber walls cooled by a fluid which circulates around them or which boils in contact with them and may be a gasoline engine, a Diesel engine or the like, and for this reason the details of construction of the engine are not shown. The drive shaft 20 of the engine is connected directly or through suitable gearing 21 to the shaft 22 which actuates the compressor. If desired, a suitable clutch means, not shown, may be interposed between the drive shaft of the engine and the actuating shaft of the compressor.

The feed of solution to be distilled is introduced into the system through the line 23. The quantity of the feed that is introduced into the system may be controlled by a positive displacement pump 24 of such character that the quantity of feed introduced into the system can be controlled by the rate of operation of the pump. Suitable means, not shown, may be employed for varying the speed of the pump 24. Alternatively, a constant pressure pump may be employed or a gravity feed, and the quantity of solution fed into the system may be controlled by the valve 25. Before the solution to be distilled is introduced into the vaporization chamber 10, the solution is preheated so as to be brought up at least to approximately the boiling point of the solution by suitable preheating means. Features of the present invention relate to the means employed for preheating the solution and utilizing the waste heat generated by the engine 19 in supplying power to the compressor 11.

In the embodiment of this invention shown in Fig. 1, solution to be distilled is passed directly through cooling passages in the engine 19. Another portion of the solution to be distilled is passed through a preheater heat exchanger whereby this particular portion of the solution to be distilled is heated by out-of-contact heat exchange with hot condensate condensed in the condenser heat exchange means 13. The feed line 23 before reaching the preheating means divides into two lines 26 and 27. The line 26 leads directly into the cooling jacket 28 of the engine 19 which affords a passage associated with the engine wherein waste heat from the engine may be transferred to liquid in the passage. The outlet of the cooling jacket 28 is afforded by the line 29 which eventually leads into the line 30, the line 30 being the inlet for the vaporization chamber 10. A by-pass line 31 extends between the outlet line 29 and the inlet line 26 of the cooling jacket 28 and includes a valve 32 and a pump 33, the pump serving to circulate cooling liquid through the passage afforded by the engine jacket 28. In the line 29 is a thermostat 34 which controls the valve 35 through a suitable connection 34' so that solution is prevented from flowing into the engine jacket except when the liquid emerging from the engine jacket through line 29 is heated to a desired predetermined temperature. This temperature should be approximately the boiling point of the solution that is being passed through the engine jacket. By this arrangement, the solution is recirculated through the engine jacket until it is brought up to the desired temperature, and, when the desired temperature has been attained, the thermostat 34 actuates the valve 35 so as to open the valve 35 and thereby permit cool solution to flow into the engine jacket and hot solution heated to the desired temperature to flow through line 29 and then through the line 30 and to the vaporization chamber. In this manner, sufficient cool solution is caused to flow through the engine cooling system to maintain the engine at desired operating temperature. If the liquid flowing from the engine jacket through line 39 should fall below the desired temperature to which the thermostat 34 is adjusted, the valve 35 will be automatically controlled by the thermostat so as to cut down the supply of cool liquid entering the engine jacket until the liquid discharged from the engine jacket attains the desired temperature. In this manner, a continuous flow of solution heated to the desired temperature, approximately that of the boiling point of the solution, is discharged through the line 29 and thence through line 30 and into the vaporization chamber 10. In order to prevent boiling in the engine jacket due to local heating of the solution to a temperature somewhat above the boiling point of the solution, a pressure-reduction valve 36 may be employed which maintains the solution in the engine jacket under pressure sufficiently high to prevent formation of an undue amount of vapor in the engine jacket. In this manner, for example, if an aqueous solution is being passed through the engine jacket, the solution may be maintained under super-atmospheric pressure while in the engine jacket so as to inhibit boiling, and the heated aqueous solution may be passed through the pressure-reducing valve 36 which serves to reduce the pressure on the solution to the pressure which is maintained in the vaporization chamber, ordinarily atmospheric pressure.

The line 27 directs the portion of the solution to be distilled which does not pass through the engine jacket through the preheater heat exchanger 37, where it is brought into out-of-contact and counterflow heat exchange relation with hot condensate discharged from the condenser heat exchange means 13 in the vaporization chamber. The line 27 may be provided with a relief valve 38 so that the balance of the predetermined amount of feed not passing through the engine jacket will flow through the line 27 and through the preheater heat exchanger 37. The solution is fed into the system at a pressure which readily overcomes the back pressure imposed on the feed by the relief valve 38. The pumps 24 and 33 may be operated by any suitable means not shown but preferably derived from the engine.

The overflow line 18 has a branch line 39 which is adapted to direct hot concentrated solution from the vaporization chamber 10 through the heat exchanger 37 in out-of-contact heat exchange relation with solution being directed into the vaporization chamber 10 through the line 27. The line 39 is controlled by valve 40. The hot overflow may also be discharged from the system through the line 41 controlled by the valve 42. It is apparent, therefore, that all of the overflow can be directed through the preheater heat exchanger 37 or all may be discharged through the line 41. Moreover, by adjusting the valves 40 and 42, any desired intermediate proportion of the overflow can be directed through the heat exchanger 37.

The operation of the embodiment of this invention shown in Fig. 1 is along the following lines. In instituting distillation, all of the feed is first passed into the engine jacket and is recirculated therein until it is brought up approximately to the boiling point of the solution. The heated liquid is then introduced into the vaporization chamber and the operation of the compressor is started so as to withdraw vapors from the vaporization chamber and compress them to a pressure at which they will condense in out-of-contact heat exchange with boiling solution in the vaporization chamber, thereby supplying heat with which to maintain vaporization of solution being introduced into the vaporization chamber. During this interval, any air in the system is discharged and the work done by the compressor supplies the heat required to institute and maintain the distillation conditions as described more fully in my Patents Nos. 2,185,595 and 2,185,596. If desired, in this and other embodiments herein shown the valve 95 in vapor by-pass 96 may be opened to assist in instituting distillation conditions as described in my patents referred to, the valve 95 normally being kept closed after distillation conditions have been attained. During the institution and maintenance of the distillation, the thermostat 34 controls valve 35 so that the proper amount of fresh cool solution is introduced into the cooling jacket of the engine to prevent the engine from overheating and any excess of feed is forced past the relief valve 38 so that the excess feed will flow through line 27 and through the preheater heat exchanger 37 in out-of-contact heat exchange with hot condensate directed through the preheater heat exchanger by the line 17. The quantity of solution that is directed through the engine jacket is controlled by the thermostat 34 so that the solution fed from the engine jacket into the vaporization chamber is at approximately the boiling point of the solution. The solution which does not pass through the engine jacket 28 passes through the line 27 and the valve 38 is set to maintain a slightly higher pressure on the pressure side than on the pressure side of the pressure-reducing valve 36. By this arrangement, sufficient solution is permitted to pass the thermostatically-controlled valve 35 to adequately cool the engine and the solution is taken from the engine at a predetermined desired temperature. The solution which passes through the line 27 is preheated in the preheater heat exchanger 37 by out-of-contact counterflow heat exchange with hot condensate discharged by line 17 from the condenser heat exchanger 13. Since the volume of solution passing through the preheater heat exchanger 37 is considerably less than the total amount of feed, the solution passing through line 27 can likewise be heated to approximately the boiling point of the solution by the hot condensate flowing through line 17. If the amount of solution to be preheated in the preheater heat exchanger 37 is equal to or less than the volume of hot condensate, the portion of the solution in heat exchange with the hot condensate can be heated to approximately the boiling point of the solution before the solution is introduced into the vaporization chamber. If the volume of the solution is substantially less than the volume of the hot condensate, the condensate will not be completely cooled in the preheater heat exchanger, but this normally is immaterial. On the other hand, if the volume of the portion of the solution passing through the preheater heat exchanger 37 is slightly greater than the amount of hot condensate used to preheat the incoming solution, part or all of the overflow from the vaporization chamber may be directed through the line 39 and through the preheater heat exchanger 37 to assist in preheating the portion of the incoming solution passing through the heat exchanger at least approximately to its boiling point. Usually, however, there is no necessity for passing the hot overflow through the heat exchanger. This is of advantage, as mentioned above, especially when the hot condensate contains a high proportion of solid material which might crystallize or form harmful incrustations if the hot overflow were cooled substantially while in heat exchange relation with incoming cool solution. It may be desirable in some instances to cool the hot overflow to below scalding temperature, e. g., below about 150° F. To accomplish this, however, extremely simple and inpensive heat exchange means may be used, such as a straight pipe through which the hot overflow may be directed in counterflow heat exchange relation with incoming fresh solution.

It is apparent from the foregoing that the system above described is self-regulatory and is adapted to take care of variations in the amount of waste heat generated during the operation of the engine, inasmuch as any such variations merely result in corresponding minor variations in the temperature of the effluents which are directed from the system in heat exchange with the portion of the feed which passes through the preheater heat exchanger 37. In many types of operation, the waste heat generated during the operation of the engine will be found to correspond roughly to the sensible heat taken from the system by the concentrated solution withdrawn from the vaporization chamber. This permits the discard of the hot overflow without utilizing the sensible heat contained therein in maintaining a proper heat balance. If there is insufficient waste heat transferred from the engine to permit discard of all the hot overflow, suitable adjustment can readily be effected by adjusting the position of valves 40 and 42 so as to control the amount of hot overflow that is directed in heat exchange with incoming fresh solution. The system can therefore be adjusted so that sensible heat in the hot condensate that is withdrawn from the system is approximately equal to the amount by which the heat supplied to the system by heat transfer from the engine to solution being introduced into the vaporization chamber is in excess of sensible heat losses by conduction and radiation through the walls of the apparatus and by withdrawal of condensate. It may be noted that, in preheating the solution that enters the vaporization chamber, the waste heat transferred from the internal combustion engine and the heat derived from the hot condensate is supplied to the fresh solution in parallel heat exchange relation as distinguished from sequentially heating the fresh solution.

During the operation, a dilute aqueous solution, for example, can readily be brought to a temperature in the neighborhood of 200 to 210° F. by transfer of waste heat from the internal combustion engine to one portion of the solution, the remaining portion being heated by heat supplied by the hot condensate. If desired, the solution in the cooling passage of the engine can be kept at a pressure of 5 to 15 lbs. per square inch, so that the solution can be heated still further, e. g., to about 230° F. in the case of solution having a boiling point as high as this without excessive formation of vapor in the cooling passage of the engine. In either event, the solution to be distilled is heated to approximately the boiling point of the solution, namely, sufficiently so that the solution may be vaporized and distilled by condensation of compressed vapor on the condenser heat exchange means. Preferably, in this embodiment of this invention and in the others herein described, the solution is preheated to within about 5 to 15° F. of the boiling point of the solution. It is usually undesirable to preheat the solution to a temperature that is 30° F. or more less than the boiling point of the solution at the pressure maintained in the vaporization chamber. Preheating of solution to the extent above indicated is regarded as preheating to approximately the boiling point of the solution.

Figure 2:
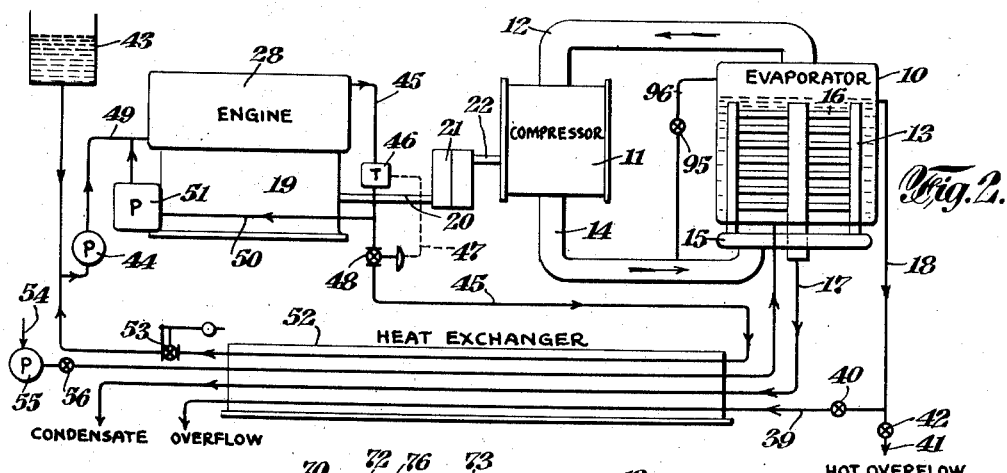
Fig. 2 is a side elevational schematic view of an alternate embodiment of this invention.

Referring to Fig. 2, the vaporization chamber 10, the compressor 11, and the engine 19 may be the same as previously described in connection with Fig. 1. Also, the vapor lines 12 and 14, the condenser heat exchange means 13, the header 15, the shafts 20 and 22, and the transmission gearing 21 may be the same. As in Fig. 1, the condensate flows out of the condenser heat exchange means through line 17 and the overflow is discharged through line 18.

In the embodiment of this invention shown in Fig. 2, the waste heat generated during the operation of the engine 19 is utilized to preheat incoming fresh solution in the following manner. An engine-cooling liquid is pumped from an expansion chamber 43 by pump 44 through line 49 into the cooling jacket 28 of the engine 19. Engine-cooling liquid is discharged from the jacket 28 by line 45 which contains the thermostat 46. The thermostat 46, through connection 47, controls the action of valve 48 in the line 45. Between the inlet and outlet of the engine jacket is a by-pass 50 containing a pump 51 adapted to circulate the engine-cooling liquid through the jacket of the engine. The thermostat 36 is adjusted so as to control the valve 48 in such manner that the engine-cooling liquid may pass the valve only when the engine-cooling liquid has been heated to a predetermined temperature, which temperature preferably is approximately the boiling point of solution to be fed into the vaporization chamber 10. The pump 44 is a constant pressure type of pump adapted to impel flow of the engine-cooling liquid past the valve 48 and through the preheater heat exchanger 52 to the extent that is permitted by the action of the valve 48 under the control of the thermostat 46. If desired, a pressure-reducing valve 53 may be employed so as to maintain the engine-cooling liquid in the engine jacket 28 under superatmospheric pressure and thereby prevent boiling of the engine-cooling liquid while in the engine jacket. Alternatively, the engine-cooling liquid may be selected so as to have a sufficiently high boiling point to prevent boiling of the liquid in the engine jacket.

The incoming solution is fed through the system from line 54. The rate of feed may be controlled by the rate of actuation of a positive displacement pump 55 or by use of a constant pressure pump or a gravity head and adjustment of a valve 56. The incoming solution is directed in out-of-contact counterflow heat exchange with the engine-cooling liquid in the preheater heat exchanger 52. The incoming solution is likewise heated by out-of-contact counterflow heat exchange with hot condensate discharged from the condenser heat exchanger 13 through line 17. These two sources of heat for preheating the incoming solution are normally amply sufficient to heat the incoming solution to approximately its boiling point before it enters the vaporization chamber. It is to be noted that both the engine-cooling liquid and the hot condensate are heated to at least approximately the boiling point of the solution being distilled, and, since the total volume of the engine-cooling liquid plus the hot condensate is at least as great as the volume of the incoming solution, there is sufficient sensible heat to preheat the incoming solution. If, however, any additional heat is desired, such additional heat may be supplied by bringing all or part of the hot overflow of concentrated solution from the vaporization chamber through line 39 into heat exchange with the incoming solution in the heat exchanger 52.

The general operation of the embodiment of this invention shown in Fig. 2 is essentially the same as that hereinabove described in connection with Fig. 1. The embodiment shown in Fig. 2 has, however, the advantage that the incoming fresh solution is not passed directly through the cooling jacket of the internal combustion engine. Some liquids, such as liquids containing a high percentage of salt, would be undesirable for passing directly through the engine jacket. Any such difficulty is overcome, however, by utilizing the device shown in Fig. 2 whereby an engine-cooling liquid is heated by the engine and is then brought into out-of-contact heat exchange with incoming fresh solution. In this case, also, it is to be noted that the waste heat transferred from the engine and heat derived from hot condensate is supplied to the fresh solution in parallel heat exchange relation and non-sequentially. Both the engine-cooling liquid and the effluent from the vaporization chamber are heated at least to approximately the boiling point of the solution preheated by heat exchange therewith and present a combined volume that is at least about equal to and preferably is somewhat greater than the quantity of feed being introduced into the vaporization chamber, so that the feed becomes preheated at least approximately to its boiling point.

Figure 3:
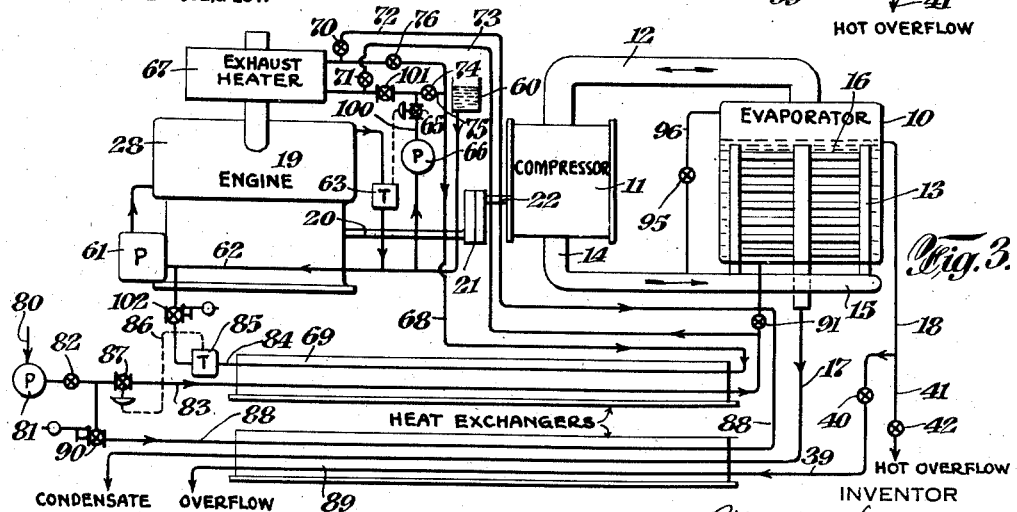
Fig. 3 is a side elevational schematic view of a further alternate embodiment of this invention.
Figure 4:
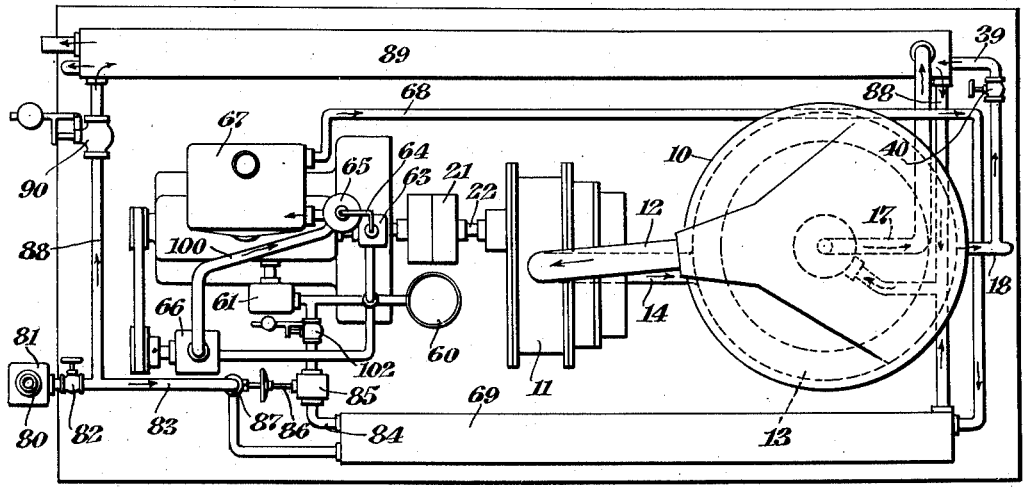
Fig. 4 is a plan view showing a physical embodiment of apparatus suitable for use in the practice of this invention, the apparatus being the apparatus shown schematically in Fig. 3, with certain optional valving and piping omitted for the purpose of clarity.
Figure 5:
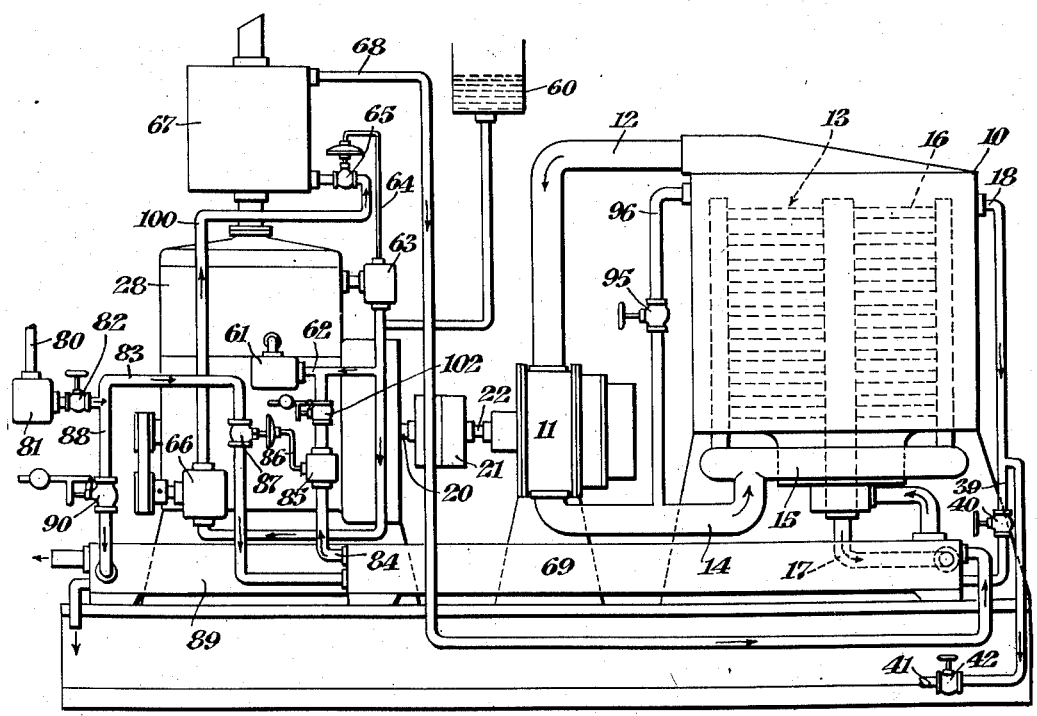
Fig. 5 is a side elevational view of the apparatus shown in Fig. 4.

Referring to Figs. 3, 4 and 5, the vaporization chamber 10, the compressor 11 and the engine 19 may be the same as in the preceding figures. Similarly, the vapor lines 12 and 14, the condenser heat exchange means 13, the header 15, the condenser passages 16, the shafts 20 and 22, and the gearing means 21 may also be the same as previously described. The hot condensate or distillate is discharged from the condenser heat exchange means by line 17 and the overflow of concentrated solution is discharged from the vaporization chamber by the line 18.

The waste heat generated during the operation of the engine 19 is utilized to assist in preheating the incoming solution in the following manner. In the embodiment shown in Figs. 4 and 5, the engine-cooling liquid is first heated in the cooling passages of the engine jacket and is subsequently heated to a somewhat higher temperature by an exhaust heater before it is brought into heat exchange relation with a portion of the incoming solution. This arrangement is also shown in the schematic representation shown in Fig. 3, and, in so far as the showing of Figs. 4 and 5 is also shown in Fig. 3, the same reference characters are used.

The cooling liquid from an expansion chamber 60 is circulated by pump 61 through line 62 and through the cooling jacket 28 of the engine. The liquid emerging from the cooling jacket passes the thermostat 63, which, through connection 64, controls the action of thermostatic valve 65 in line 100. In the line 100 leading to the thermostatic valve 65 is a constant pressure pump 66. By this arrangement, engine-cooling liquid is circulated through the engine-cooling jacket 28 until it reaches a predetermined temperature at which the thermostatic valve 65 is opened so as to permit the heated cooling liquid to pass through the exhaust heater 67. The engine-cooling liquid is further heated by contact with a surface maintained in a heated condition by the hot exhaust gases. For example, the engine-cooling liquid may be maintained in the jacket 28 at a temperature of 170 to 180° F., which is regarded as especially suitable for the operation of certain types of internal combustion engines. The engine-cooling liquid upon being heated to this temperature is then permitted to pass to the exhaust heater 67 wherein its temperature may be elevated somewhat further, e. g., to a temperature of about 210° F. The engine-cooling liquid is discharged in a heated condition from the exhaust heater 67 through the line 68 which directs the heated engine-cooling liquid through the preheater heat exchanger 69. Referring to Fig. 3, in order to direct the heated cooling liquid in this manner, the valves 70 and 71 in lines 72 and 73 respectively and valve 74, line 75, are maintained closed. At the same time, the valves 76 and 101 are kept open so as to permit the free flow of solution through the line 68.

The incoming feed is supplied by the line 80, and the rate of feed is controlled by any suitable means such as a positive displacement pump 81 which controls the rate of feed according to the rate at which it is operated. Alternatively, the pump 81 may be a constant pressure pump or a gravity head may be used and the rate of feed controlled by a valve 82. One part of the solution being fed into the system is directed through the line 83, through the preheater heat exchanger 69 in out-of-contact counterflow heat exchange with the engine-cooling liquid directed from the exhaust heater through line 68. As the engine-cooling liquid leaves the preheater heat exchanger 69 through line 84, it passes a thermostat 85 which, through a connection 86, controls the position of thermostatic valve 87. In this manner, an amount of the incoming fresh solution is directed through the line 83 which is adapted to be heated to approximately its boiling point in the preheater heat exchanger 69. If more or less than the amount of fresh solution which can be heated to approximately its boiling point passes into the heat exchanger 69, the temperature of the engine-cooling liquid discharged from this heat exchanger will vary and the thermostatic valve 87 will be adjusted automatically by the thermostat 85 in order to adjust the amount of fresh solution which is adapted to be heated to approximately its boiling point by the engine-cooling liquid.

The balance of the desired amount of solution fed into the apparatus is passed through the line 88 and through the preheater heat exchanger 89. A pressure-reducing valve 90 permits fresh solution to be directed through the preheater heat exchanger 69, except for the amount which is prevented from so doing by the thermostatic valve 87. In the preheater heat exchanger 89, the fresh incoming solution is brought into counterflow heat exchange relation with hot condensate discharged from the condenser heat exchange means 13 by line 17. In the heat exchanger 89, the incoming fresh solution may also be brought in contact with hot overflow from the vaporization chamber 10. As described in previous embodiments of this invention, the amount of hot overflow passed through the preheater heat exchanger 89 may be regulated so that all or part or none of the overflow is passed through the preheater heat exchanger 89.

The operation of the embodiment of this invention shown in Figs. 4 and 5 is generally similar to the operation of the embodiment shown in Figs. 1 and 2 and more nearly resembles the operation of the embodiment shown in Fig. 2. As mentioned above, the engine-cooling liquid may be circulated through the jacket of the engine so as to be maintained at a temperature appropriate for the internal combustion engine that is used. As soon as this temperature is attained, the cooling liquid is passed through the exhaust heater in which its temperature is raised to at least approximately the boiling point of the solution to be vaporized in the vaporization chamber. The engine-cooling liquid thus heated is then brought into counterflow heat exchange with an amount of the incoming solution which can be preheated to substantially its boiling point by the engine-cooling liquid in the preheater heat exchanger 69. Preferably, the quantity of solution preheated in exchanger 69 is approximately equal to the quantity of engine-cooling liquid passed therethrough. If desired, the engine-cooling liquid can be maintained under superatmospheric pressure by a pressure-reducing valve 102. However, an engine-cooling liquid of suitably high boiling point may be used so as to obviate the necessity for maintaining the engine-cooling liquid under pressure. The balance of the incoming solution is heated approximately to its boiling point by out-of-contact counterflow heat exchange in heat exchange 89 with the hot condensate. As described in connection with previous embodiments of this invention, the heat supplied by the hot condensate is normally sufficient or more than sufficient to heat the portion of the incoming solution passing through the preheater heat exchanger 89 to approximately its boiling point. The system is automatically controlled so that any variation in waste heat generated by the engine will merely result in minor variation in the temperature of the distillate discharged from the heat exchanger 89. Moreover, further control may be had by regulating the position of valves 40 and 42 so as to control the amount of hot concentrated solution discharged from the evaporator which is brought into heat exchange with incoming solution. Preferably, the hot condensate is discharged without any cooling or with only sufficient cooling to reduce it to below scalding temperature.

Referring to the schematic representation shown in Fig. 3, attention is called to the fact that this embodiment of my invention will operate substantially identically with the embodiment shown in Fig. 2 by opening the valve 74 in line 75 and closing the valve 101, thereby cutting out the exhaust heater. In such case, the engine would have to be operated at a temperature sufficiently high to heat the engine-cooling liquid to a temperature approximately the boiling point of the solution to be distilled. If it is desired to operate the engine at a somewhat lower temperature without running the engine-cooling liquid through the exhaust heater, the solution being introduced into the vaporization chamber may be passed through the exhaust heater. Thus, by closing the valve 101 and opening the valve 74, the exhaust heater can be cut out of the engine-cooling liquid system as mentioned above. By closing the valves 91 and 76 and opening the valves 70 and 71, the solution that is preheated in the preheater heat exchanger 69 may be caused to pass through the exhaust heater before it is fed into the evaporator. In operating the system in this manner, the engine may serve to heat the engine-cooling liquid to approximately 180° F., for example. This engine-cooling liquid is then utilized to heat a portion of the incoming fresh solution passing through the preheater heat exchanger 69, to approximately the same temperature. If it is desired to raise the temperature of the solution still further before introducing the solution into the evaporator, the solution is passed through the exhaust heater 67 which serves to heat it to the desired temperature, e. g., from approximately 180° F. to approximately 210° F.

It is apparent that an exhaust heater such as that shown in Figs. 3, 4 and 5, may be used in conjunction with the embodiments of this invention shown in Figs. 1 and 2.

Figure 6:
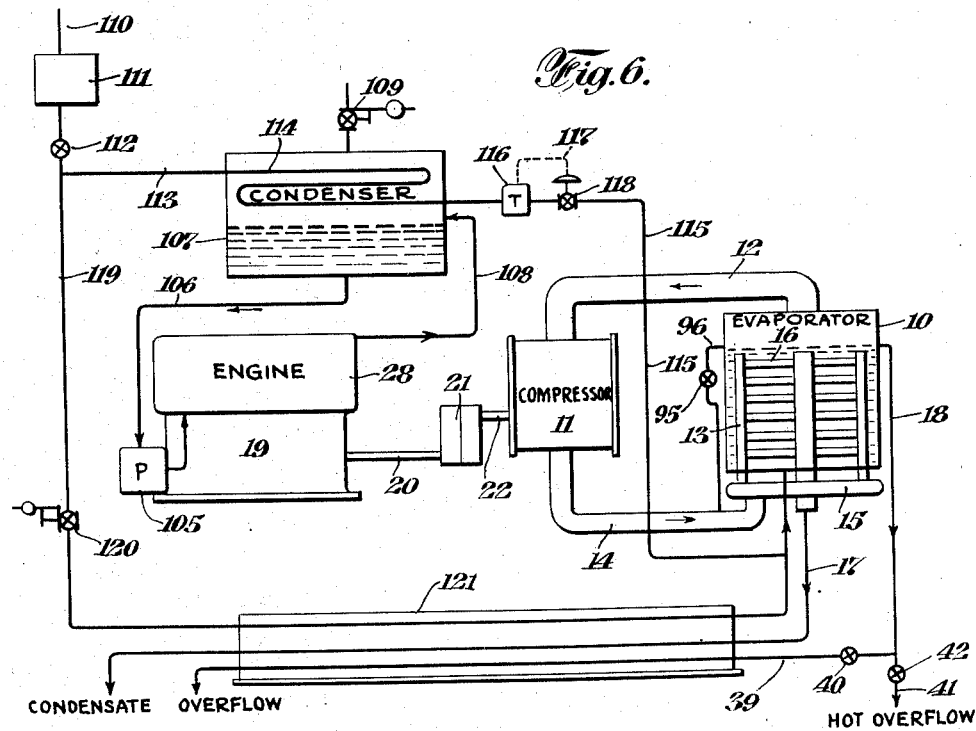
Fig. 6 is a side elevational schematic view of a still further alternate embodiment of this invention.

Referring to Fig. 6, the vaporization chamber 10, the compressor 11, and the engine 19 may be the same as in the preceding figures. Similarly, the vapor lines 12 and 14, the condenser heat exchange means, the header 15, the condenser passages 16, the shafts 20 and 22, and the gearing 21 also may be the same as previously described. The hot condensate or distillate is discharged from the condenser heat exchange means by line 17 and the overflow of concentrated solution is discharged from the vaporization chamber by the line 18.

The embodiment shown in Fig. 6 is especially suitable for use in connection with an internal combustion engine adapted to operate at relatively high temperatures and cooled by the boiling of a liquid. In certain types of internal combustion engines, e. g., heavy oil engines, wherein high cylinder temperatures are desirable, the cylinders are cooled by allowing the cooling liquid to boil, thereby absorbing latent heat from the cylinder walls. When such a system is used, if the vapor generated is allowed to blow off into the air, it is necessary to supply make-up liquid, and if this make-up liquid is not very clean, a gradual fouling of the cooling passages of the engine takes place. In the practice of this invention, it is possible to eliminate the necessity for adding make-up liquid and at the same time it is possible to utilize the waste heat in the distillation operation.

In the embodiment shown in Fig. 6, the engine-cooling liquid is circulated through the cooling passages afforded by the engine jacket 28 by pump 105 in line 106 which is arranged to direct a liquid, e. g., water from the preheater-condenser heat exchanger 107. The line 108 directs the heated fluid, which normally is a mixture of liquid and vapor from the jacket 28 to the preheater-condenser heat exchanger 107, and the vapor, e. g., steam, rises to the upper portion of the exchanger 107. If desired, a safety-valve 109 may be used in connection with the exchanger.

The solution to be distilled is fed into the system by line 110 by means of a positive displacement pump 111 or by a gravity head controlled by a valve 112. The feed may pass by line 113 into the preheater-condenser heat exchanger 107 through coil 114 or other suitable means for maintaining the solution in out-of-contact heat exchange relation with vapor in the exchanger 107. Sufficient surface is provided by the coil 114 so that the solution being passed therethrough is heated approximately to its boiling point and the heated solution then is directed by the line 115 to the vaporization chamber 10. A thermostat 116 through connection 117 operates the thermostatic valve 118 so as to prevent solution passing to the vaporization zone which has not been heated to a predetermined temperature, namely, approximately the boiling point of the solution in the usual case. The heat absorbed by the solution condenses the vapor in the exchanger 107. Normally, the amount of feed is sufficient to provide sufficient solution passing through the coil 114 to condense all of the vapor generated in the engine-cooling passages and the condensed liquid is thereupon recirculated through the said passages. In this way, the engine is maintained at normal operating temperature and the waste heat is transferred to incoming solution being fed into the system.

The feed which is not permitted to pass the thermostatically-controlled valve 118 is directed through the line 119 in which there is a pressure-reducing valve 120 which maintains a slight back pressure that tends to cause solution to pass through the preheater-condenser heat exchanger 107 to the limit permitted by the valve 118. The solution directed through the line 119 passes through the preheater heat exchanger 121 wherein it is brought into out-of-contact counterflow heat exchange with hot condensate taken from the condenser heat exchange means 13 by line 17. The hot concentrated solution in vaporization chamber 10 may also be directed through the preheater heat exchanger 121 by the line 39 in out-of-contact counterflow heat exchange with the incoming fresh solution. By adjusting the valves 40 and 42, all or none or any intermediate proportion of the hot concentrated solution may be directed through the preheater heat exchanger 121. In the preheater heat exchanger 121, the portion of the incoming solution passing therethrough is brought approximately to its boiling point.

The operation and utility of the embodiment shown in Fig. 6 has been described in connection with the foregoing description thereof. During the operation, all of the waste heat generated by the engine in supplying power to the compressor is transferred to a portion of the incoming solution and conditions are controlled so that this portion of the solution is heated approximately to its boiling point. The balance of the feed is heated in parallel heat exchange relation to approximately its boiling point primarily by the sensible heat contained in the hot condensate, and any additional heat required is supplied by the hot concentrated solution.

The pumps used in the different embodiments of this invention may, as aforesaid, be operated by any suitable means, not shown (usually by the engine) and preferably means, not shown, are used to vary the speed of the pumps. In all of the embodiments of this invention, the feed is preferably controlled by a positive displacement pump operating at a speed that is proportional to the speed of actuation of the compressor as described in my application Serial Number 371,298, filed December 23, 1940, for Apparatus for and method of distillation so as to afford an automatic control for the rate of feed. The different physical embodiments of this invention may be supplied with a suitable heat insulating material, not shown, so as to reduce heat losses.

The practice of this invention may be further illustrated in connection with the following description of typical examples thereof.

Consider first the recovery of fresh potable water from sea water. Assume that it is desired to produce 12 gallons (100 lbs.) per minute of fresh water from sea water at 50° F., and containing 3% of salt. In order to prevent the deposition of solid salt in parts of the evaporator, it is desirable to limit the concentration of salt in the overflow to 15%. This requires a feed of 15 gallons (125 lbs.) per minute of sea water. Assume that the efficiency of the compressor is 60% on the adiabatic basis, and that the condensing pressure is 4 lbs. per sq. in. above atmospheric pressure, the evaporation taking place at atmospheric pressure. The adiabatic power required for compression is 17.7 B. t. u. per lb. or a total of $12 \times 8.34 \times 17.7 = 1770$ B. t. u. per minute or 41.7 H. P. The output of the engine driving the compressor must therefore be $41.7/0.6 = 70$ H. P. (2960 B. t. u. per min.) approximately. The amount of heat that must be removed in the jacket water may be assumed to be approximately equal to the engine power output or 70 H. P. or approximately 3000 B. t. u. per minute. This is sufficient to heat 20 lbs. of water 150° F., i. e., from 50° F. to 200° F.

There is then, during steady operation, 20 lbs. of sea water per minute passing through the engine jackets (or through the heat exchanger 69 of Fig. 3 or 107 of Fig. 6) and 105 lbs. of sea water per minute passing through the condensate exchanger (37 of Fig. 1 or 89 of Fig. 3 or 121 of Fig. 6). Since there is only 100 lbs. of condensate to heat this 105 lbs. of feed, it will be desirable to recover at least 750 B. t. u., (5 lbs. $\times$ 150° F.) additional heat from the overflow and, since there is 25 lbs. of overflow, it must be cooled 30° F.

There is, therefore, 2960 B. t. u. in the form of heat of compression to take care of losses in the condensate and radiation loss. If the condensate is cooled by the feed to within 15° of the feed temperature, there will be a loss of 1500 B. t. u. in the condensate, and there will remain 1460 B. t. u. for radiation losses. If the radiation losses are greater than this, then more heat must be recovered from the overflow, while, if the radiation losses could be reduced to 1460—750 or 710 B. t. u., then it would not be necessary to recover any heat from the overflow and it could all be discharged through valve 42. In this illustration, the radiation would more likely run to 2000 or 3000 B. t. u. so that a substantial amount of heat would have to be recovered from the overflow.

As a second example, consider the concentration of dilute sugar solutions such as refinery "sweet water." In this case, the solution may be concentrated to a high degree without depositing solids so long as it is kept near the boiling point, but on cooling, the solids crystallize out rapidly. In order to use the present equipment for concentrating such solutions, it is necessary that they be removed through pipe 41 and valve 42. For this purpose, it is desirable to use a less efficient cycle. Assume, for example, that we wish to concentrate 15 gallons per minute of a 3% sugar solution to obtain a solution containing 45% of solids. In this case, we would have approximately 1 gallon of "overflow" or concentrate, and 14 gallons of distillate. We will assume that the condensing pressure is 6 lbs. per sq. in. in order to reduce the size of heat exchangers required, and that, as the distillate is to be used in process, it is desired that it be 50° F. hotter than the feed. Assuming the same compressor efficiency as before, the heat balance will work out as follows:

The power required for compression will now be $14 \times 8.34 \times 30.3 / .06 = 5900$ B. t. u. per minute or 139 H. P., and an additional 5900 B. t. u. per minute will be available in the jackets of the engine.

The loss in the distillate will be $$14 \times 8.34 \times 50 = 5850 \text{ B. t. u.}$$

per minute, and that in the overflow will be $8.34 \times 150 = 1250$ B. t. u. per minute. The net available for radiation losses will be $11,800 - (5850 + 1250) = 4700$ B. t. u. per minute, which is ample to supply radiation losses. If the waste heat were not recovered as in the present invention, it would be necessary to use almost twice as much power or to cool the condensate down to within 20° F. of the feed, and reduce the radiation losses to half of that given above.

My present invention, therefore, permits the utilization of a certain amount of waste heat to improve the flexibility of design and operation without unbalancing the heat cycle, and without adding any external cooling means.

It is apparent from the foregoing that, according to my invention, very high efficiency can be had while at the same time simplification and economies in the equipment may be effected. Thus, in the practice of this invention, it is possible and preferable to employ a compressor having the highest possible efficiency and requiring a minimum of power. When the compressor supplies all of the energy introduced into the system, heat resulting from inefficiency to the operation of the compressor can be made sufficient to counterbalance heat losses from the system. According to this invention, these heat losses are compensated for by the introduction into the system of waste heat from the internal combustion engine and this enables the employment of a compressor having maximum efficiency.

It is also apparent that substantially all of the energy supplied by a fuel adapted to operate an internal combustion engine is put to use in carrying on the distillation. Such of the energy as can be converted by the engine into mechanical power is introduced into the system by compressing the vapors. Additional energy in the form of sensible heat in excess of that required to maintain the engine at normal operating temperature is used as part of the heat required to heat the solution to boiling and distill off vapors. Moreover, according to this invention, the radiator and fan equipment of an ordinary internal combustion engine may be eliminated and the cost thereof saved, and in operation the power required to operate the fan (about 3% to 6% of the output of the engine) is saved with distinct economy of operation.

In the practice of this invention, larger heat losses in the condensate are permissible, and in fact variations in those heat losses effects an automatic balancing of the system as a whole. This being the case, simpler and less costly preheater heat exchangers may be employed. Also, less costly and less efficient heat insulation for the apparatus may be used.

In practicing this invention, one can eliminate from the system all or a large part of the sensible heat contained in concentrated solution withdrawn from the vaporization chamber. Since the concentrated solution, which may also be referred to as overflow, carries all the impurities in the feed in a concentrated state, it tends to foul heat exchange surfaces. It therefore is distinctly advantageous to eliminate these heat exchange surfaces altogether or limit them to a very simple form which can readily be cleaned. Moreover, it is possible to discharge very concentrated solution such as concentrated sugar solution which would tend to crystallize out if cooled substantially in a heat exchanger.

It is to be noted that the system is kept in perfect balance for maintaining distillation. This is accomplished without introducing supplementary condenser units such as would be the case if waste steam from a non-condensing steam engine were introduced into the system. Introduction of steam seriously unbalances the system and contaminates the distillate and is not permitted according to the present invention.

While certain specific embodiments of this invention have been shown and described herein, it is to be understood that this has been done for purposes of exemplification and that modifications may be made without departing from the scope of this invention. Accordingly, the scope of this invention is to be regarded as defined by the language of the following claims as construed in the light of the foregoing description of my invention.

I claim:

1. Distillation apparatus comprising the combination with a vaporization chamber, a compressor for compressing vapor, means arranged for directing vapor from said vaporization chamber into said compressor for compression therein, condenser heat exchange means arranged to maintain a condensing vapor in out-of-contact heat exchange with solution in said vaporization chamber, means for directing compressed vapor from said compressor and into said condenser heat exchange means in out-of-contact heat exchange with solution in said vaporization chamber, and an internal combustion engine arranged to actuate said compressor to compress vapor therein, of feed means arranged for introducing solution to be distilled into said vaporization chamber and preheating means adapted to preheat solution being introduced into said vaporization chamber by said feed means, said preheating means including means for directing condensate from said condenser heat exchange means in out-of-contact heat exchange with solution being directed by said feed means into said vaporization chamber to preheat said solution and means arranged to transfer waste heat generated by said internal combustion engine from said internal combustion engine to solution being directed by said feed means into said vaporization chamber.

2. Distillation apparatus comprising the combination with a vaporization chamber, a compressor for compressing vapor, means arranged for directing vapor from said vaporization chamber into said compressor for compression therein, condenser heat exchange means arranged to maintain a condensing vapor in out-of-contact heat exchange with solution in said vaporization chamber, means for directing compressed vapor from said compressor and into said condenser heat exchange means in out-of-contact heat exchange with solution in said vaporization chamber, and an internal combustion engine arranged to actuate said compressor to compress vapor therein, of feed means arranged for introducing solution to be distilled into said vaporization chamber and preheating means adapted to preheat solution being introduced into said vaporization chamber by said feed means, said preheating means including means arranged for directing condensate from said condenser heat exchange means into out-of-contact heat exchange with solution being introduced by said feed means into said vaporization chamber before said condensate cools to a temperature below a temperature that is approximately the temperature of vapor condensing in said condenser heat exchange means, heat transfer means arranged to transfer waste heat from said internal combustion engine to a surface and to maintain said surface at a temperature at least approximately as high as the aforesaid temperature of vapor condensing in said condenser heat exchange means, and means for directing solution being directed by said feed means into said vaporization chamber in contact with said surface.

3. Distillation apparatus comprising the combination with a vaporization chamber, a compressor for compressing vapor, means arranged for directing vapor from said vaporization chamber into said compressor for compression therein, condenser heat exchange means arranged to maintain a condensing vapor in out-of-contact heat exchange with solution in said vaporization chamber, means for directing compressed vapor from said compressor and into said condenser heat exchange means in out-of-contact heat exchange with solution in said vaporization chamber, means for directing condensate from said condenser heat exchange means, and an internal combustion engine arranged to actuate said compressor to compress vapor therein, of a circulatory cooling system for said internal combustion engine including a cooling passage and means to recirculate a cooling liquid through said passage, feed means arranged to introduce solution to be distilled into said vaporization chamber, means for cooling liquid in said cooling system by means of cool solution being directed by said feed means into the vaporization chamber thereby preheating said solution, means for preheating solution fed into said vaporization chamber by out-of-contact heat exchange with condensate directed from said condenser heat exchange means, and control means for controlling the temperature of the cooling liquid in said circulatory system by varying responsive to variation in the temperature of the engine-cooling liquid in the circulatory system the amount of cool solution used to cool said engine-cooling liquid.

4. Distillation apparatus according to claim 3 which includes means for maintaining said circulatory cooling system under super-atmospheric pressure.

5. Distillation apparatus according to claim 3 which includes means for introducing fresh liquid into said circulatory system and for directing heated liquid from said circulatory system, a thermostat arranged for actuation responsive to variation in temperature of liquid directed from said circulatory system, and a valve controlled by said thermostat and arranged to prevent liquid substantially below a predetermined temperature from being directed from said circulatory system.

6. Distillation apparatus comprising the combination with a vaporization chamber, a compressor for compressing vapor, means arranged for directing vapor from said vaporization chamber into said compressor for compression therein, condenser heat exchange means arranged to maintain a condensing vapor in out-of-contact heat exchange with solution in said vaporization chamber, means for directing compressed vapor from said compressor and into said condenser heat exchange means in out-of-contact heat exchange with solution in said vaporization chamber, and an internal combustion engine arranged to actuate said compressor to compress vapor therein, of feed means arranged for introducing solution to be distilled into said vaporization chamber, means for directing condensate condensed in said condenser heat exchange means from said condenser heat exchange means, preheater heat exchange means arranged for preheating solution to be distilled by counterflow heat exchange with hot condensate discharged from said condenser heat exchange means, and heat transfer means arranged to transfer waste heat from said internal combustion engine to solution to be distilled, said preheater heat exchange means and said heat transfer means being arranged in parallel heat exchange relation with solution being directed into said vaporization chamber by said feed means.

7. A distillation unit comprising a vaporization chamber, a compressor, means for directing vapors from said vaporization chamber to said compressor for compression therein, condenser heat exchange means in said vaporization chamber, means for directing compressed vapor from said compressor into said condenser heat exchange means in out-of-contact heat exchange with solution to be vaporized, means for withdrawing condensate from said condenser heat exchange means, an internal combustion engine arranged to actuate said compressor to compress vapor, feed means for introducing solution to be vaporized into said vaporization chamber, means for withdrawing concentrated solution from said vaporization chamber, and preheating means for preheating solution introduced into said vaporization chamber partly by heat derived from said condensate withdrawn from said condenser heat exchange means, partly by heat derived from waste heat developed by said internal combustion engine, and partly by heat derived from said concentrated solution withdrawn from said vaporization chamber, and means for adjusting the proportion of concentrated solution withdrawn from said vaporization chamber that is brought into heat exchange relation with solution being fed into said vaporization chamber.

8. A distillation unit according to claim 7 wherein said preheater means includes an elongated heat exchanger disposed horizontally adjacent said engine, compressor and evaporator arranged for counterflow heat exchange between condensate withdrawn from said condenser heat exchange means and solution fed into said vaporization chamber.

9. Distillation apparatus comprising the combination with a vaporization chamber, a compressor for compressing vapor, means arranged for directing vapor from said vaporization chamber into said compressor for compression therein, condenser heat exchange means arranged to maintain a condensing vapor in out-of-contact heat exchange with solution in said vaporization chamber, means for directing compressed vapor from said compressor and into said condenser heat exchange means in out-of-contact heat exchange with solution in said vaporization chamber, and an internal combustion engine arranged to actuate said compressor to compress vapor therein, of feed means arranged for feeding solution to be distilled into said vaporization chamber, means for directing hot condensate from said condenser heat exchange means in out-of-contact heat exchange relation with solution being fed into said vaporization chamber and heat transfer means arranged to transmit waste heat from said internal combustion engine to solution being fed into said vaporization chamber, said heat transfer means including means for transferring to said solution heat derived from the cylinder walls of said engine, means for transferring additional heat to said solution by heat derived from hot gases in the exhaust manifold of the engine, and means for maintaining liquid in heat exchange relation with said cylinder walls at a substantially lower temperature than the temperature of liquid in heat exchange relation with the exhaust manifold.

10. Distillation apparatus according to claim 9 which includes first heat transfer means arranged for heating said liquid by heat transfer from the cylinder walls of said internal combustion engine, second heat transfer means arranged for heating said liquid by heat transfer from exhaust gases, means for directing said liquid from said first to said second heat transfer means, a pump and by-pass arranged for circulating liquid through said first heat transfer means, and means for regulating the quantity of liquid directed from said first to said second heat transfer means.

11. Distillation apparatus comprising the combination with a vaporization chamber, a compressor for compressing vapor, means arranged for directing vapor from said vaporization chamber into said compressor for compression therein, condenser heat exchange means arranged to maintain a condensing vapor in out-of-contact heat exchange with solution in said vaporization chamber, means for directing compressed vapor from said compressor and into said condenser heat exchange means in out-of-contact heat exchange with solution in said vaporization chamber, and an internal combustion engine arranged to actuate said compressor to compress vapor therein, of preheater heat exchange means adapted to maintain two liquids in out-of-contact heat exchange relation, means for directing hot condensate from said condenser heat exchange means into said preheater heat exchange means, means for directing a portion of solution to be distilled into said preheater heat exchange means in out-of-contact counterflow heat exchange with hot condensate in said preheater heat exchange means and thence to said vaporization chamber, a cooling passage arranged for transferring waste heat from said internal combustion engine to a liquid contained in said cooling passage, and means for directing another portion of solution to be distilled into said cooling passage and from said cooling passage to said vaporization chamber.

12. Distillation apparatus according to claim 11 which includes means for maintaining solution in said cooling passage at super-atmospheric pressure.

13. Distillation apparatus according to claim 11 which includes a pump and by-pass arranged to recirculate solution through said cooling passage, and means for controlling the amount of solution directed from said passage to said vaporization chamber.

14. Distillation apparatus according to claim 11 which includes means for withdrawing hot concentrated solution from said vaporization chamber and directing it in out-of-contact heat exchange relation with the portion of solution preheated by said preheater heat exchange means, and means for controlling the proportion of the hot concentrated solution withdrawn from said vaporization chamber that is brought into heat exchange relation with said portion of solution preheated by said preheater heat exchange means.

15. Distillation apparatus comprising the combination with a vaporization chamber, a compressor for compressing vapor, means arranged for directing vapor from said vaporization chamber into said compressor for compression therein, condenser heat exchange means arranged to maintain a condensing vapor in out-of-contact heat exchange with solution in said vaporization chamber, means for directing compressed vapor from said compressor and into said condenser heat exchange means in out-of-contact heat exchange with solution in said vaporization chamber, and an internal combustion engine arranged to actuate said compressor to compress vapor therein, of feed means for directing solution to be distilled into said vaporization chamber, a cooling passage associated with said engine arranged for transferring waste heat from said internal combustion engine to a fluid contained in said passage, means arranged for directing fluid heated in said cooling passage from said cooling passage in out-of-contact heat exchange with solution fed into said vaporization chamber by said feed means, and means arranged for directing hot condensate from said condenser heat exchange means in out-of-contact heat exchange with solution fed into said vaporization chamber by said feed means.

16. Distillation apparatus according to claim 15 wherein said feed means is adapted to bring solution being fed into said vaporization chamber non-sequentially in counterflow heat exchange relation with said hot condensate and with said heated fluid and means for controlling the temperature of the fluid that is directed from said cooling passage into heat exchange relation with said solution.

17. Distillation apparatus according to claim 15 which includes a common heat exchanger adapted to maintain liquids in out-of-contact heat exchange relation, said feed means being adapted to direct solution to be vaporized in said vaporization chamber through said common heat exchanger, and said means for directing said heated fluid and said means for directing said hot condensate, each said means being arranged to direct said heated fluid and hot condensate respectively in simultaneous counterflow heat exchange relation in said common heat exchanger with solution fed into said vaporization chamber by said feed means.

18. Distillation apparatus according to claim 15 which includes a pump and by-pass for recirculating fluid through said cooling passage without being brought into heat exchange with solution fed into said vaporization chamber by said feed means, and means for controlling the quantity of fluid directed from said cooling passage into heat exchange relation with solution fed into said vaporization chamber.

19. Distillation apparatus comprising the combination with a vaporization chamber, a compressor for compressing vapor, means arranged for directing vapor from said vaporization chamber into said compressor for compression therein, condenser heat exchange means arranged to maintain a condensing vapor in out-of-contact heat exchange with solution in said vaporization chamber, means for directing compressed vapor from said compressor and into said condenser heat exchange means in out-of-contact heat exchange with solution in said vaporization chamber, and an internal combustion engine arranged to actuate said compressor to compress vapor therein, of feed means for introducing solution to be distilled into said vaporization chamber, a cooling passage associated with said engine arranged for transferring waste heat from said internal combustion engine to a liquid contained in said passage, means arranged for directing liquid heated in said cooling passage from said cooling passage in out-of-contact counterflow heat exchange with solution being fed into said vaporization chamber by said feed means, means for controlling the temperature of liquid that is directed from said cooling passage and brought into said out-of-contact counterflow heat exchange with solution being fed into said vaporization chamber, means arranged for directing hot condensate from said condenser heat exchange means in out-of-contact counterflow heat exchange with solution being fed into said vaporization chamber, means for directing hot concentrated solution from said vaporization chamber in out-of-contact heat exchange with solution being fed into said vaporization chamber, and means for controlling the proportion of said hot concentrated solution withdrawn from said vaporization chamber that is brought into heat exchange relation with solution being fed into said vaporization chamber.

20. Distillation apparatus comprising the combination with a vaporization chamber, a compressor for compressing vapor, means arranged for directing vapor from said vaporization chamber into said compressor for compression therein, condenser heat exchange means arranged to maintain a condensing vapor in out-of-contact heat exchange with solution in said vaporization chamber, means for directing compressed vapor from said compressor and into said condenser heat exchange means in out-of-contact heat exchange with solution in said vaporization chamber, and an internal combustion engine arranged to actuate said compressor to compress vapor therein, of a cooling passage associated with said engine arranged for transferring waste heat from said engine to a fluid contained in said passage, a first preheater heat exchanger adapted to maintain fluid in out-of-contact heat exchange with each other, means for directing fluid from said cooling passage through said first preheater heat exchanger and back to said cooling jacket, means for directing a first portion of solution to be distilled in out-of-contact heat exchange with fluid in said first preheater heat exchanger and thence to the distillation chamber, a second preheater heat exchanger adapted to maintain fluids in out-of-contact heat exchange relation, means for directing hot condensate from said condenser heat exchange means through said second preheater heat exchanger, and means arranged for directing a second portion of solution to be distilled in counterflow heat exchange with hot condensate in said second preheater heat exchanger and for preheating said second portion of solution simultaneously with the preheating of said first portion of solution in said first preheater heat exchanger.

21. Distillation apparatus according to claim 20 which comprises means for adjusting the relative amounts of solution passed through said first and second preheater heat exchangers.

22. Distillation apparatus according to claim 20 which includes means for controlling the temperature of liquid directed from said cooling passage to said first preheater heat exchanger.

23. Distillation apparatus comprising the combination with a vaporization chamber, a compressor for compressing vapor, means arranged for directing vapor from said vaporization chamber into said compressor for compression therein, condenser heat exchange means arranged to maintain a condensing vapor in out-of-contact heat exchange with solution in said vaporization chamber, means for directing compressed vapor from said compressor and into said condenser heat exchange means in out-of-contact heat exchange with solution in said vaporization chamber, and an internal combustion engine arranged to actuate said compressor to compress vapor therein, of a cooling passage associated with said engine arranged for transferring waste heat from said engine to a fluid contained in said passage, a preheater condenser heat exchanger, means for directing fluid in mixed liquid and vapor form from said passage to said preheater condenser heat exchanger and thence to said cooling passage, means for directing a first portion of solution to be distilled into said preheater condenser heat exchanger for heat exchange with fluid in vapor form condensing therein and thence to said vaporization chamber, a preheater heat exchanger, means for directing hot condensate from said condenser heat exchange means through said preheater heat exchanger, and means arranged for directing a second portion of solution to be distilled in counterflow heat exchange with hot condensate in said preheater heat exchanger and thence to said vaporization chamber, said preheater condenser heat exchanger and said preheater heat exchanger being arranged to simultaneously preheat said first and second portions of solution directed into said vaporization chamber.

24. Distillation apparatus according to claim 23 which includes means for preventing solution from being directed from said preheater condenser heat exchanger that is below a predetermined temperature.

25. In a method of distillation wherein vapor is evolved from a solution in a vaporization zone, the evolved vapor is compressed to a pressure at which the condensing temperature is substantially above the boiling point of the solution, compressed vapor is condensed in out-of-contact heat exchange relation with said solution in said vaporization zone, hot condensate is withdrawn from said vaporization zone and fresh solution to be distilled is introduced into said vaporization zone, the maintenance of distillation utilizing energy supplied by a fuel appropriate for operation of an internal combustion engine in an operation wherein distillation is maintained partly by mechanical power generated by an internal combustion engine operated by said fuel and utilized to operate said compressor to compress vapors as aforesaid in said compressor and partly by the sensible heat produced during the operation of the engine that is in excess of the heat required to maintain the engine at normal operating temperature, said sensible heat being supplied to solution to be distilled as part of the heat required to bring said solution to its boiling temperature and cause vaporization thereof.

26. In a method of distillation wherein vapor is evolved from a solution in a vaporization zone, the evolved vapor is compressed to a pressure at which the condensing temperature is substantially above the boiling point of the solution, compressed vapor is condensed in out-of-contact heat exchange relation with said solution in said vaporization zone, hot condensate is withdrawn from said vaporization zone and fresh solution to be distilled is introduced into said vaporization zone, the steps comprising supplying power to actuate the compressor by an internal combustion engine, thereby introducing part of the energy required to maintain distillation into the distillation operation, the balance of the required energy being supplied by sensible heat withdrawn from the internal combustion engine in maintaining the engine cooled to normal operating temperature and transferred to solution to be distilled, thereby preheating solution entering the distillation zone, said sensible heat being transferred to said incoming solution in parallel relation with heat transferred to incoming solution that is in out-of-contact heat exchange relation with hot condensate withdrawn from the vaporization zone, thereby preheating solution entering the vaporization zone approximately to its boiling point.

27. In a method of distillation wherein vapor is evolved from a solution in a vaporization zone, the evolved vapor is compressed to a pressure at which the condensing temperature is substantially above the boiling point of the solution, compressed vapor is condensed in out-of-contact heat exchange relation with said solution in said vaporization zone, hot condensate is withdrawn from said vaporization zone and fresh solution to be distilled is introduced into said vaporization zone, the steps comprising supplying power to said compressor by an internal combustion engine, preheating a portion of solution to be distilled in said distillation zone by out-of-contact counterflow heat exchange with said hot condensate to approximately the boiling point of the solution, and separately preheating another portion of said solution by transfer thereto of waste heat from said internal combustion engine to approximately the boiling point of said solution, said portions of said solution that are separately preheated being commingled and subjected to vaporization in said vaporization zone.

28. A method according to claim 27 wherein the portion of solution heated by transfer thereto of waste heat of the internal combustion is heated by passing it through a cooling passage associated with said engine.

29. In a method of distillation wherein vapor is evolved from a solution in a vaporization zone, the evolved vapor is compressed to a pressure at which the condensing temperature is substantially above the boiling point of the solution, compressed vapor is condensed in out-of-contact heat exchange relation with said solution in said vaporization zone, hot condensate is withdrawn from said vaporization zone and fresh solution to be distilled is introduced into said vaporization zone, the steps comprising supplying power to said compressor by an internal combustion engine, preheating solution introduced into said vaporization zone by directing hot condensate withdrawn from said vaporization zone in counterflow heat exchange relation with solution being introduced into said vaporization zone, heating fluid by transfer to it of waste heat of said internal combustion engine to at least approximately the boiling point of said solution, and directing said fluid while so heated in out-of-contact heat exchange relation with solution being introduced into said vaporization zone.

30. A method according to claim 29 wherein said fluid is circulated through a cooling passage associated with said internal combustion engine to cool said engine, a portion of said solution is preheated by heat exchange with said fluid to approximately the boiling point of said solution and another portion of said solution is simultaneously heated approximately to its boiling point by out-of-contact counter heat exchange with the hot condensate from said vaporization zone.

31. In a method of distillation wherein vapor is evolved from a solution in a vaporization zone, the evolved vapor is compressed to a pressure at which the condensing temperature is substantially above the boiling point of the solution, compressed vapor is condensed in out-of-contact heat exchange relation with said solution in said vaporization zone, hot condensate is withdrawn from said vaporization zone and fresh solution to be distilled is introduced into said vaporization zone, the steps comprising supplying power to actuate said compressor by an internal combustion engine, transferring substantially all of the waste heat required to maintain said engine cooled to a predetermined operating temperature to solution being introduced into said vaporization zone to preheat said solution, supplying heat to solution being introduced into said vaporization zone by out-of-contact counterflow heat exchange with hot condensate condensed in said vaporization zone, and withdrawing hot concentrated solution from the system, the sensible heat withdrawn from the system in said hot condensate being approximately equal to excess heat supplied to the system by said waste heat transferred from said internal combustion engine to solution being introduced into said vaporization zone.

ROBERT V. KLEINSCHMIDT.

CERTIFICATE OF CORRECTION.

Patent No. 2,280,093. April 21, 1942.

ROBERT V. KLEINSCHMIDT.

It is hereby certified that error appears in the printed specification of the above numbered patent requiring correction as follows: Page 4, first column, line 14, for "the heat" read --a heat--; line 24-25, for "inpensive" read --inexpensive--; page 8, first column, line 19, in the equation, for "30.3/.06" read --30.3/0.6--; and line 50, for "to" after "inefficiency" read --of--; and that the said Letters Patent should be read with this correction therein that the same may conform to the record of the case in the Patent Office.

Signed and sealed this 9th day of June, A. D. 1942.

(Seal)

Henry Van Arsdale,
Acting Commissioner of Patents.